April 3, 1951     S. C. HURLEY, JR     2,547,324

APPARATUS FOR DETERMINING THE VOLTAGE OF A BATTERY

Filed Nov. 26, 1945

INVENTOR.
SAMUEL C. HURLEY, JR.
BY Benedict & Swartwood
ATTORNEYS

Patented Apr. 3, 1951

2,547,324

UNITED STATES PATENT OFFICE 2,547,324

APPARATUS FOR DETERMINING THE VOLTAGE OF A BATTERY

Samuel C. Hurley, Jr., Danville, Ill.; Wilmina L. Hurley, executrix of said Samuel C. Hurley, Jr., deceased, assignor to Wilmina L. Hurley, Danville, Ill.

Application November 26, 1945, Serial No. 630,899

1 Claim. (Cl. 175—183)

This invention relates to an improved apparatus for amplification and particularly for amplifying small voltage and current changes. It also relates to an apparatus for determining an electrical characteristic particularly from a source of direct current potential.

One object of the invention is to provide an improved amplifying system for determining or recording a relatively weak direct current or voltage or weak differentials in voltage by means of measuring instruments requiring relatively high current and voltages. It is also an object of this invention to use such weak currents and voltages after amplification for controlling another operation.

The amplification of very small direct current potentials is a very difficult problem which heretofore has not been properly solved. The required measuring equipment and amplifying systems for making such small measurements, for example the measurement of .00005 volt necessitates a device relatively insensitive to external electrical conditions and unaffected by variations in the characteristics of the amplifying tubes and the related equipment required. In the measurement of small unidirectional voltage for operating a measuring instrument or for the control of regulating devices, many difficulties have been encountered. Amplification of small unidirectional voltage by means of a direct current amplifier has not proved successful since slow oscillations of the amplified voltage have occurred due to irregularities of the amplifier tube characteristic, causing a corresponding slow oscillation in the amplified output. Also external electrical disturbances and excitements such as the near presence of an electric light bulb or other source of alternating current potential causes an induced alternating current effect which must be completely or substantially avoided when determining or utilizing extremely small voltage changes.

It is therefore an object of my invention to provide an apparatus which is stable, accurate and reproducible in its results and which is not affected by external electrical disturbances and which minimizes the internal effects due to different characteristics of amplifying tubes and the associated equipment.

A further object of the invention is to transpose a unidirectional voltage or current characteristic into a single pulse and then amplifying the single pulse after which the single pulse is measured or is used to control equipment for actuating another device.

Still another object of the invention is to provide a means for eliminating all induced alternating current which would seriously affect the accuracy and reproducibility of the amplifying system if not eliminated.

Still another object of the invention is to provide an apparatus for testing the voltage and current characteristics of batteries and similar items which must meet rigid specifications and wherein the tolerance is of the order of less than .00005 volt.

Another object of the invention is to provide an apparatus for determining small current changes or to determine the current capacity of a battery wherein it is impossible to directly check the current due to the internal resistance of the battery which causes a variation depending upon the amount of current drawn from the battery. In my apparatus I accomplish this object by drawing a current from the battery through a standard or known resistance which reduces the voltage and increases the current to approximately a constant value and this constant value can then be measured and the actual value can be correlated with the reduced value of voltage or increased value of current by the use of Ohm's law to determine the actual value since the value of the resistance is known.

This invention has a wide variety of uses particularly wherever it is desired to measure, indicate or to use as a control means small current and voltage changes or differentials. It is useful for determining small voltage changes of the order of .00005 volt. It is useful for determining the value of a resistance. It is useful in recording pyrometry, for measuring the voltage changes of thermocouples, photoelectric cells or radiant energy changes. It also has great utility for determining variations of electrolytic conditions of industrial solutions particularly in the determination of pH values of solutions wherein it is desirable to measure accurately and automatically small voltage variations. My device is also suitable for measuring current by applying an IR drop to the circuit to be measured which always gives a reproducible result. It is also useful for means of indicating mechanical stress due to an electrical change. It is also useful in colorimetry which depends on slight differences of the amount of light received by photocells. It is also useful in checking batteries and the like for current and voltage characteristics. It is useful in determining characteristics of electronic tubes such as radio tubes, amplifying tubes, photocells and the like.

Broadly my invention comprises impressing a potential on a control grid of an amplifier by at least a portion of the voltage characteristic of the article being tested for an electrical property such as voltage, current or resistance and then transposing the output from the amplifier into a single pulse by means of a capacitance coupling to a control grid of an amplifying tube and then amplifying the single pulse.

Other objects, advantages and uses will become apparent by referring to the drawings in which Figure 1 illustrates a complete wiring diagram and amplification system for comparing a battery for its voltage characteristic with a standard battery of known voltage characteristics.

Figure 1:
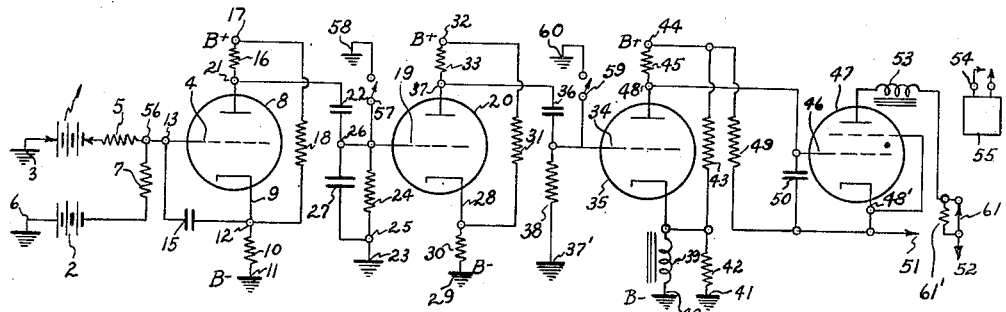
Figures 4, 5:
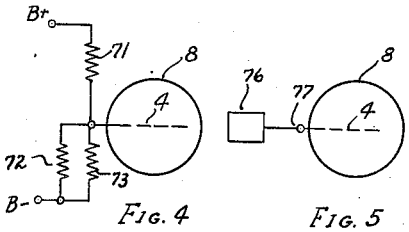

Figure 4 also shows another means for determining resistance characteristics employing the amplifying system of Figure 1.

Figure 5 shows the use of a circuit breaker switch for determining voltage and current characteristics in pyrometer measurements and the like where the connection must be frequently broken in order that another pulse may be amplified by the system of Figure 1.

Figure 2:
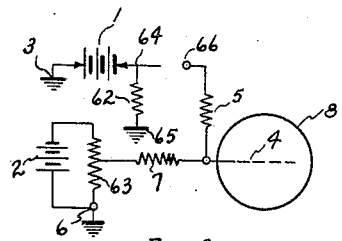
Figure 2 is a modification of the diagram shown in Figure 1 for measuring small current differentials or for measuring the current capacity of a battery by drawing current from the unknown battery through a resistance of known value and then amplifying the resulting reduced voltage in the same manner as in Figure 1.
Figure 6:
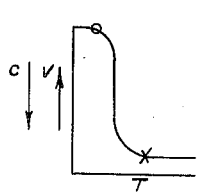

Figure 6 shows a graph of the current and voltage changes when the current is drawn through a resistance as shown in Figure 2 and is particularly useful in checking batteries.

Figure 7:
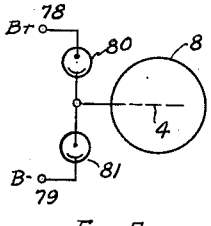

Figure 7 shows an apparatus for comparing the amount of light received by the photoelectric cells.

Figure 8:
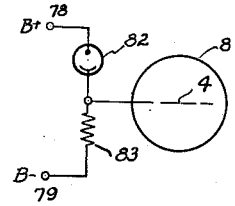

Figure 8 shows a means for determining the amount of light received by a photoelectric cell. Both Figures 7 and 8 employ the amplification system shown in Figure 1.

Figure 9:
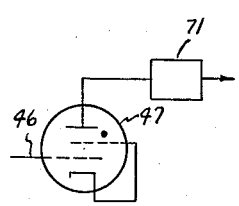

Figure 9 shows the position of an indicator for directly indicating the current and voltage rather than using currents or voltages or resistances as a control means such as shown in Figure 1.

Figure 1 illustrates a method and apparatus for determining whether the voltage of an unknown battery equals or exceeds the voltage of a standard or known battery. The amplification system shown in Figure 1 however has a wide variety of uses as heretofore discussed. However for the sake of illustration of the amplification circuit, it will be described in connection with the determination of a voltage characteristic of a battery.

An unknown battery 1 is to be compared with a known battery 2 and if the battery 1 does not equal or exceed the voltage of battery 2, the apparatus of Figure 1 will reject the battery 1. The battery 1 is placed in an inspection zone not illustrated or described since it forms no part of my invention. The positive side of the battery is grounded at 3. The negative side is connected to the control grid 4 through a known resistance 5. The negative side of battery 1 is connected to the control grid 4 for reasons which will be hereinafter explained. The positive side of battery 2 is also connected to ground at point 6 and the negative side is also connected to the control grid 4 through a known or standard resistance 7. The amplifying tube 8 is a standard triode type vacuum tube. The cathode 9 of tube 8 is connected through resistance 10 to ground at 11 in order to obtain a normal bias on the tube such that the tube is conducting in approximately the middle of its operating characteristic. It is apparent that if the voltage of battery 1 equals or exceeds the voltage of battery 2, less current will flow through the tube 8 due to impressing a higher negative bias on control grid 4. If the battery 1 is of less voltage than battery 2, a more positive bias will be placed on the control grid 4 causing more current to flow through tube 8.

The cathode 9 is connected from point 12 to point 13 through the condenser 15. The capacitance coupling of the cathode to the control grid obtains regeneration which increases the sensitivity of the amplification system. However the capacity of the condenser must be sufficiently low in comparison for the value of the resistance 10 in order to avoid self-sustained oscillation. As much regeneration as possible is desirable and therefore the value of the condenser 15 in comparison with the resistor 10 is only lowered to a point to avoid self-sustained oscillation. It is obvious that if such oscillation were obtained it would be impossible to obtain only a single pulse. In using a standard vacuum tube of the triode type such as tube 8 which is commonly referred to as the "high gain" type, the condenser 15 is of the order of .01 microfarad and the resistance 10 is approximately 400 ohms. With these values of the condenser 15 and resistance 10, substantial regeneration is obtained and yet self-sustained oscillations are prevented.

The anode circuit of tube 8 contains a load resistor 16 connected to a positive source of direct current potential at 17. The cathode is connected through resistor 18 from points 12 to 17 in order to obtain a constant voltage on the cathode.

A control grid 19 in a similar triode tube 20 is connected to point 21 through the condenser 22. The tubes 8 and 20 are 180° out of phase. The use of the condenser 22 transpose the output change of the tube 8 into a single pulse and the control grid 19 receives the single pulse. The obtaining of a single pulse is advantageous because direct coupled amplification is unsuitable, unstable and is affected by minute changes in voltage and the single pulse feature of my invention is stable and not subject to minute changes in voltage. The control grid 19 is connected to the ground 23 through the resistor 24 as part of the biasing means for tube 20. Point 25 below resistor 24 is connected to point 26 or to the control grid 19 through the condenser 27. As heretofore pointed out, great care must be taken to substantially eliminate all induced alternating current from exterior sources and the condenser 27 bypasses any induced alternating current from external sources to the ground 23 and therefore the accuracy or results of my amplifying system is not affected.

The cathode 28 of tube 20 is connected to the ground 29 through the resistor 30 and is also connected through the resistor 31 to a direct current positive source of potential at 32 in order to again provide a constant voltage on the cathode. The anode circuit contains the load resistor 33 connected to point 32. No bypass for induced alternating current is provided in this stage of amplification since it has been found that it is not necessary.

The control grid 34 of a third triode vacuum type tube 35 is connected through condenser 36 to point 37 and thus tube 35 is 180° out of phase with tube 20. The control grid 34 is connected to ground at 37' through the resistor 38.

The cathode of tube 34 is connected through a typical choke coil 39 to the ground 40. The choke coil is provided for the elimination of the effect of any exteriorly induced alternating current since the choke coil induces an alternating current opposite and equal to any alternating current caused by external excitement. The cathode of tube 34 is connected to ground 41 through voltage dividing resistor 42 and also connected through the resistor 43 to a positive side of a direct current source of potential at 44. The anode circuit of tube 44 contains a load resistor 45 and below the load resistor 45 the control grid 46 of the gaseous-filled arc discharge type of amplifying tube 47 is connected at point 48. Tube 47 is 180° out of phase with the tube 35. The cathode 48' is biased through the dividing resistor 49 and connected to point 44. It is also connected to the control grid 46 through condenser 50 which provides a bypass for an exteriorly induced alternating current. The operating source of power for the tube 47 is provided by a suitable source of direct current at points 51 and 52. The screen grid of the tube 47 is connected to the cathode in conventional manner as shown. The anode circuit of the tube 47 contains a relay coil 53 which when energized actuates the relay switch 54 which in turn controls the control circuit 55 which is the means for accepting and rejecting the battery according to whether or not it meets the predetermined specification.

Thus when the gaseous filled tube 47 ionizes, the relay coil 53 is activated and the relay switch 54 is closed. This is the condition when the unknown battery 1 exceeds or equals the known battery 2 in voltage and which means that the battery is acceptable and when switch 54 closes, it actuates the accept circuit accepting the battery.

Since the four amplifying tubes are alternately 180° out of phase, when the tube 47 ionizes, tube 35 is substantially in cut-off position, tube 20 substantially approaches saturation in conductance and tube 8 has had its control grid 4 driven in more negative direction thereby reducing the flow of current through the tube 8. For a bad battery or when the unknown battery 1 is of less voltage than battery 2, the control grid 4 is driven in a more positive direction causing more current to flow through the anode circuit of the tube 8 which drives tube 20 to substantial cut-off position, tube 35 approaches saturation, tube 47 does not ionize, the relay coil 53 is not activated, the relay switch 54 is not closed and the control circuit 55 therefore rejects the battery.

In one operation, the unknown battery is compared with a known battery of 1.3 volts. Therefore if the unknown battery 1 equals 1.3 volts or is greater than 1.3 volts, the battery is good. If the unknown battery for example should be 1.5 volts as compared to the standard battery of 1.3 volts, it is obvious that the control grid 4 is driven in a more negative direction and as heretofore explained, battery 1 would be accepted. This is true because there is a flow of current through resistor 5 which impresses a more negative bias on the tube 8. If the unknown battery 1 is of less potential than 1.3, it means in effect that control grid 4 is biased more positively and therefore the bias is changed in a positive direction and the tube 8 will conduct more current. The tube is normally biased when no unknown battery is connected to the control grid 4 such that the tube is always conducting some current which increases the sensitivity of the amplification.

Another important feature is that the resistors 5 and 7 are of different values. In testing a 1.3 voltage battery the resistor 5 has a value of 250,000 ohms and the resistor 7 a value of 750,000 ohms. Having resistor 5 smaller in comparison with resistor 7 increases the sensitivity because any slight voltage change in battery 1 has an increased effect over a circuit where the two resistors are equal. Furthermore having the resistor 7 relatively large prevents damage to the control grid 4 in case a dead cell 1 were placed in inspection position since under those circumstances if the resistor 7 were low, an excessive positive voltage might be impressed on control grid 4 seriously damaging the grid and the characteristics of the tube. Damage to the control grid 4 is further prevented by having the negative side of the unknown battery 1 and the known battery 2 connected to the control grid. If the unknown cell 1 should greatly exceed what is to be expected, all that will happen in the circuit shown will be to drive the control grid in a more negative direction which causes less current to flow through tube 8 and no damage will occur. However if the positive sides of the batteries were connected to the control grid and the voltage value was higher than expected a sufficiently high positive potential might be placed on the control grid 4 resulting in damage to the characteristics of the tube.

Referring as to how the pulse is obtained, let us assume that the plate circuit of the tube 8 is at rest. In this circumstance there is a constant voltage impressed upon the capacitance coupling condenser 22 and since there is no electron motion, there is no change in the value of the potential. When the plate circuit of the tube 8 approaches B+ potential or the potential of the point 17, a positive potential is impressed on one side of the condenser. In order for the condenser to pass an impulse or a single pulse, it must be connected to ground through the resistor 24 so that the electrons are attracted to the opposite plates of the condenser causing a voltage drop across the resistor 24 which impresses a positive potential on the control grid 19. As the plate circuit of the tube 8 approaches ground potential, a comparatively negative potential is impressed on the condenser 22 which will repel electrons from the opposite plates. These electrons in order to get away from the plate will pass through the resistor 24 to ground creating a current flow through the resistor 24 which due to the voltage drop impresses a negative potential on the control grid 19. Thus it is seen that only a single pulse is received by the tube 20 and immediately thereafter the bias on the control grid tends to reach equilibrium or returns to its normal bias. A capacitance coupling to the control grid 4, similar to the capacitance coupling including condenser 22 and resistor 24, could be connected between the point 56 and the control grid 4 and in that case the tube 8 would also only receive a pulse instead of receiving the direct current voltage as long as the battery 1 is in the test position. However capacitance couplings have a certain amount of voltage drop and the use of a capacitance coupling at the point 56 would greatly reduce the sensitivity and it has been found that in most cases the difficulties previously discussed in amplifying small direct current voltages are sufficiently overcome by having the capacitance coupling between tubes 8 and 20 and a similar capacitance coupling is not required at point 56. In other words, by my preferred method of amplification, I do not sacrifice reproducibility of results and I gain considerable sensitivity in the circuit. Once a pulse is received by the amplifying system that is all that is received regardless of how long the battery 1 is in its test position. However, I provide a second capacitance coupling between tubes 20 and 35 which has a primary advantage of avoiding separate circuits for biasing each of the individual amplifiers which makes for a more compact unit and furthermore it increases the sensitivity and tends to make the entire amplification system more stable. There is no capacitance coupling required between tubes 34 and 46.

Since when gas filled arc discharge type tubes like 47 once ionize, when connected to a source of current potential across points 51 and 52, they continue to ionize and will not return to normal condition until the anode voltage is substantially reduced, a capacitance coupling would have very little effect on the tube 47 and furthermore it would be difficult to obtain a biasing of the tube sufficiently critical due to the short pulse impressed by a capacitance coupling between the tubes 35 and 47 and for that reason a capacitance coupling is undesirable.

Batteries like battery 1 can be tested at the rate of at least 60 per minute. The time from the time the battery is placed in the inspection position until the relay switch 54 is actuated is about .15 second. The complete cycle is about .75 second. One of the reasons for this rapid inspection is the provision of switch 57 connected to ground 58 although it could be accomplished by a bypass around the resistor 24 to ground 23 instead of the switch being connected to ground 58. As soon as a pulse has passed through the system, the switch 57 as well as a similar switch 59 connected to ground 60 is closed which bypasses any charge on condensers 22 and 36 to ground rendering the system inoperative. Although the condensers 22 and 36 if not grounded would leak through the resistors 24 and 38 and eventually reach equilibrium and although this is very rapid, it is not as rapid as desirable in high speed inspection operations. Therefore in connection with the inspection of the battery 1, switches 57 and 59 are actuated by cams (not illustrated or described) correlated with the inspection operation shortly after the battery 1 is placed in inspection position between the ground 3 and the resistance 5, in order to quickly place the amplifying system in condition for the next inspection. In addition such grounding prevents undersiable surges through the system. One of the most important advantages is the starting of each inspection from same electrical reference point. By this means it is not necessary to wait between inspections or recordings for the condensers 22 and 36 to leak through their respective resistors to ground.

The switch 61 has a very important function also. When the tube 47 is connected across a source of direct current, once it is ionized, it will continue to conduct until the anode voltage is materially reduced and therefore a voltage lowering switch connected in parallel with resistor 61' must be provided to place the system in condition for the next inspection. The switch 61 is also actuated by a cam correlated with the inspection mechanism for battery 1 and with the time cycle for the circuit so that such change of the voltage by the opening of the switch 61 will not occur until after the battery 1 has been tested and has had time, as controlled by the control circuit 55 and the relay switch 54, to pass to the proper chute into which either good batteries are placed or bad batteries are placed. If this switch were actuated too soon to deionize the tube 47 and place it in condition for the next inspection operation, there would not be sufficient time to permit the battery to pass down the mechanical means for dividing the batteries tested into good and bad. Thus the switch 61 actuated by a cam properly correlated acts as a time-delay for the circuit. Assuming a cycle of .75 second which is the time of the cycle for the circuit in Figure 1, and calling .00 second the moment battery 1 is placed into contact with ground 3 and resistor 5, the switch 59 is closed at about 0.4 second and the switch 57 closed at about .05 second, and the switch 61 is opened at about .64 second. It is preferable to close the switch 59 slightly before 57 in order to prevent any surges passing through the system. By taking proper precautions as I have done in my amplifying system, there is no accumulative surge which might occur and greatly destroy the reproducibility of the results.

Thus I have provided: (1) a four stage amplifying system in which the amplifying tubes are 180° alternately out of phase with capacitance couplings between the first and second tubes and between the second and third tubes; (2) no capacitance coupling between the third and fourth tubes since the fourth tube is directly biased by the output of the third tube; (3) means for preventing damage to the first tube; (4) means for completely offsetting any exteriorly induced alternating current without sacrificing sensitivity or reproducibility of results; (5) means for quickly placing the circuit into condition for the next inspection; (6) means for deionizing the tube in the last stage of amplification not only for placing the circuit in condition for the next inspection but also a new timing means for maintaining the ionization for a definite period to permit the batteries being tested to be properly sorted; (7) an extremely sensitive amplifying circuit. For example, voltage changes of .00005 voltage may be amplified to about 200 volts or an amplification of about 2,000,000 times. Around 25 volts is the minimum voltage required for operating relay switches of the type shown at 54. (8) I have also provided regeneration and yet do not obtain self-sustained oscillations which increases the sensitivity of the circuit and yet does not interfere with the reproducibility of results. (9) I provide a correlation between the resistors inserted between the unknown battery and the known battery and the control grid of the first stage of amplification which also increases the sensitivity.

Referring to Figure 2, a modification in the circuit of Figure 1 up to the control grid 4 of the first amplification stage is shown for checking current characteristics from a direct current source of potential such as a battery. Here again it is suitable for many purposes but is illustrated in connection with comparing a known current in terms of voltage against an unknown current in terms of voltage.

Throughout the drawings the same numerals will be used for comparable parts.

In checking the current of a battery, it is essential to first stabilize the current flow and the voltage potential of the battery as well as to draw current from a battery in order to test the current. Due to the internal resistance of a battery it is necessary to draw the current through a resistance like the resistor 62 such that current is greatly increased and the voltage is greatly reduced to a point where very little additional change will occur. Of course if no resistor 62 were provided between point 64 and the ground 65, that is if a straight connection were made between 64 and 65, the voltage would be substantially zero and the current would be a maximum value. This is not feasible since some voltage must be left at the point 64 in order to bias the control grid 4. Therefore the resistance 62 is correlated with the size of the battery being tested such that the current is increased and the voltage reduced to the point X illustrated in the schematic graph of Figure 6. In this case the voltage and current are plotted against time. If the resistance were such that it was attempted to check the voltage at any point between the X and O on the curve it would be so sensitive and the change would be so rapid that it would be impossible to design the circuit to always obtain reproducible results. Therefore the resistance 62 is of such a value that the current is reduced to a point where it is substantially constant although true enough the less the value of the resistance the greater the increase in current but further increase for all practical purposes is negligible as shown by the graph of Figure 6. In testing a battery of about 1.3 volts the current passing through the resistance 62 is about 1.1 amperage. The resistor 62 has a value of about one tenth ohm in order to reduce the voltage component of the current at point 64 to approximately X value as shown in Figure 6. After the current is drawn through the resistor 62, the voltage is reduced, for a good battery from about 1.3 volts to .2 volt and current drawn is about 1.1 amperes. The known battery 2 must have a value when correlated with the adjustable resistance 63 of about .2 volt or more in order to meet the predetermined current requirements. In other words, I am now comparing a standard or known battery 2 of .2 volt with an unknown battery which if good must have a voltage at point 64 of .2 vo't or higher. Once this is established the circuit is no different than the circuit in Figure 1 and at this point in the operation the switch 66 is closed and the reduced voltage of the unknown battery is compared with a comparable voltage of the known battery and the biasing effect on the control grid 4 is identical with that described for Figure 1.

Where no internal resistance is encountered, for example in a battery, the reduction of the voltage through the resistor 62 is not necessary, but the current can be checked directly, in which case the resistor 62 is not used.

Figure 3:
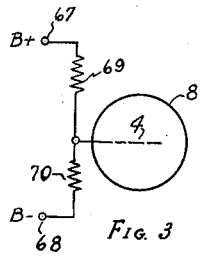
Figure 3 illustrates another modification of Figure 1 for determining resistance characteristics.

Referring to Figure 3 a method is shown for determining resistance and here again I will describe the operation in connection with comparing an unknown resistance with a known resistance although it has many other uses. Referring to Figure 3 the known resistance 70 is being compared with the unknown resistance 69 and the series circuit is connected across a known direct current source of potential having its positive terminal at 67 and its negative terminal at 68. It is apparent that if the unknown resistance 69 equals the resistance 70 a so called normal bias of tube 8 will be obtained. However if the unknown resistance 69 is greater than the known resistance 70 there will be a flow of current through the resistor 70 which will impress a negative bias on the control grid 4 which reduces the current flowing through tube 8. If the resistance 69 is less than 70, a positive potential will be placed on the tube 4. By use of suitable relays the resistance can be accepted or rejected or as is the case in all the operations discussed herein, instead of accepting or rejecting an article, an electrical characteristic such as voltage, current and resistance can be measured or checked by employing a suitable meter 71 as shown in Figure 9 in the anode circuit of the tube 47. Therefore I have shown a direct measurement means for determining the electrical characteristic.

Referring to Figure 4, another modification is shown for determining an unknown resistance which has a somewhat higher sensitivity than that shown in Figure 3. In the case of Figure 4 the standard resistances 71 and 73 of known value are provided and the unknown resistance is 72. By connecting a known resistance 73 in parallel with unknown resistance 72, for a given change in the value of the resistance 72 a greater change is obtained on the bias for the control grid 4 than that obtained in Figure 3.

Referring to Figure 5, means are provided for determining the potential in a temperature measurement or a measurement for pH value where the circuit is always connected to the source of direct current potential. In this case I am not making a comparison of a known and unknown value but I am actually determining the potential and use therefore a recording meter. The recording meter 71 is positioned in the anode circuit of tube 47 as shown in Figure 9. However since my circuit will only pass one pulse this cannot be done continuously and I therefore must provide a switch 77 to break the connection between the direct current source of potential (indicated by 76) and the control grid 4. Previously I mentioned that the cycle for the circuit of Figure 1 was about .75 second. Therefore the switch 77 may be opened at every .75 second which means that with using the recording meter 71 in Figure 9. a reading is obtained once in every .75 second. Therefore I have provided a recording means for indicating temperature, pH value, etc., which depend on small voltage changes as well as means for indicating these voltage changes in a time interval of at least once in every second which is for all practical purposes continuous. At the same time I provide a circuit for obtaining high accuracy since voltage changes of less than .0001 volt can be recorded.

Referring to Figure 7, a means is shown for testing and comparing the output of one photocell against another. Referring to Figure 7 a constant and known source of direct current potential is provided having its positive terminal at 78 and its negative terminal at 79. The circuit for Figure 7 may be used for example in colorimetry measurements where the tube 81 receives the standard amount of light and the tube 80 an unknown amount of light and both must receive the same amount of light to fulfill certain conditions. The control grid 4 is biased by the amount of light which is received by tubes 80 and 81 and slight changes in the amount of light received are accurately reflected by my method and apparatus.

It is to be kept in mind that in Figure 1 the relay switch 54 as illustrated is only actuated when the relay coil 53 is actuated but in the various modifications shown this could readily be changed within the scope of my invention. In other words, an article could be accepted when the relay switch 53 is not actuated and rejected when it is actuated.

Referring to Figure 8 the output of a phototube depending upon the amount of light received can be accurately determined and recorded by fixing and establishing the value of the resistor 83 which will bias the control grid 4 in a predetermined manner and it can be either utilized for controlling another operation or the output can be directly measured by a meter 71 as shown in Figure 9.

A switch, similar to switch 77 of Figure 5, may be used in connection with Figures 2, 7 and 8 for the same purpose as described in connection with Figure 5.

The above various descriptions and drawings are not intended to unduly limit my invention but are given only as illustration and my invention is only limited by the following claim.

I claim as my invention:

An apparatus for determining the voltage of an unknown battery comprising means connecting said unknown battery and a battery of known voltage in parallel to a common connector, a voltage dropping resistor between each battery and said common connector, a condenser having connections with said common connector such as to be charged with the voltage at the point of the common connector, an amplifying tube having an anode circuit, a cathode circuit and a control grid, means for biasing said control grid with said charge thereby providing a pulse on said tube, a second amplifier for amplifying said pulse, means for indicating the amplifying pulse, and means including a switch for grounding said condenser to remove the charge after said indication.

SAMUEL C. HURLEY, JR.

REFERENCES CITED

The following references are of record in the file of this patent:

UNITED STATES PATENTS

| Number | Name | Date |
|---|---|---|
| 2,049,306 | Matson | July 28, 1936 |
| 2,086,965 | Shepard | July 13, 1937 |
| 2,137,413 | Plaistowe | Nov. 22, 1938 |
| 2,161,495 | Witte | June 6, 1939 |
| 2,211,718 | Freeman | Aug. 13, 1940 |
| 2,225,231 | Pugh | Dec. 17, 1940 |
| 2,285,482 | Wunsch | June 9, 1942 |
| 2,319,139 | Koch | May 11, 1943 |
| 2,350,545 | Bradford | June 6, 1944 |
| 2,400,245 | Mayne | May 14, 1946 |
| 2,423,671 | Wolff | July 8, 1947 |